(12) United States Patent
Halter

(10) Patent No.: US 12,369,504 B2
(45) Date of Patent: Jul. 29, 2025

(54) TOWED OR SEMI-MOUNTED AGRICULTURAL MACHINE HAVING AN ADJUSTABLE AXLE DEVICE

(71) Applicant: KUHN SAS, Saverne (FR)

(72) Inventor: Cédric Halter, Wasselonne (FR)

(73) Assignee: KUHN SAS, Saverne (FR)

( * ) Notice: Subject to any disclaimer, the term of this patent is extended or adjusted under 35 U.S.C. 154(b) by 893 days.

(21) Appl. No.: 17/449,118

(22) Filed: Sep. 28, 2021

(65) Prior Publication Data
US 2022/0095523 A1 Mar. 31, 2022

(30) Foreign Application Priority Data
Sep. 29, 2020 (FR) ..................... 20 09860

(51) Int. Cl.
*A01B 59/042* (2006.01)
*B60G 7/00* (2006.01)
*B62D 21/02* (2006.01)

(52) U.S. Cl.
CPC ............ *A01B 59/042* (2013.01); *B60G 7/001* (2013.01); *B60G 7/005* (2013.01); *B62D 21/02* (2013.01)

(58) Field of Classification Search
CPC ...... A01B 59/042; B60G 7/001; B60G 7/005; B62D 21/02
See application file for complete search history.

(56) References Cited

U.S. PATENT DOCUMENTS

| | | | |
|---|---|---|---|
| 5,464,243 A | 11/1995 | Maiwald et al. | |
| 9,156,312 B1 | 10/2015 | Ruggeri | |
| 9,358,836 B2 * | 6/2016 | David | B60B 35/10 |
| 10,004,171 B2 * | 6/2018 | Ballu | B60B 35/1045 |
| 10,518,600 B2 * | 12/2019 | Reybrouck | B60B 35/009 |
| 2010/0075727 A1 | 3/2010 | Coers et al. | |

(Continued)

FOREIGN PATENT DOCUMENTS

| | | |
|---|---|---|
| DE | 91 02 354 U1 | 5/1991 |
| DE | 44 07 695 A1 | 9/1995 |
| EP | 1 366 650 A1 | 12/2003 |

(Continued)

OTHER PUBLICATIONS

French Preliminary Search Report issued Jun. 8, 2021 in French Application 20 09860 filed on Sep. 29, 2020, citing documents AA-AD & AO-AT therein, 8 pages (with English Translation of Categories of Cited Documents & Written Opinion).

*Primary Examiner* — Alentin Neacsu
*Assistant Examiner* — Michael R Stabley
(74) *Attorney, Agent, or Firm* — Oblon, McClelland, Maier & Neustadt, L.L.P.

(57) ABSTRACT

A towed or semi-mounted agricultural machine having a chassis on which an axle device connecting two wheels to the chassis is mounted, this axle device being provided with at least one movable part and one fixed part in such a way that the spacing between the wheels can be modified, at least one of the wheels being integral with a movable part that is connected slidingly along a longitudinal axis to the fixed part, which is integral with the chassis. Each movable part is additionally connected mechanically to the chassis by a respective articulated link, which is articulated on the one hand with the movable part by a first articulation and on the other hand with the chassis by a second articulation.

14 Claims, 5 Drawing Sheets

(56) References Cited

U.S. PATENT DOCUMENTS

2020/0231004 A1 7/2020 Langlitz et al.
2020/0288623 A1 9/2020 Husson

FOREIGN PATENT DOCUMENTS

| EP | 2 168 786 A2 | 3/2010 |
| EP | 3 707 983 A1 | 9/2020 |
| WO | WO 2015/166365 A1 | 11/2015 |
| WO | WO 2019/014466 A1 | 1/2019 |

* cited by examiner

TOWED OR SEMI-MOUNTED AGRICULTURAL MACHINE HAVING AN ADJUSTABLE AXLE DEVICE

BACKGROUND OF THE INVENTION

Field of the Invention

The present invention relates to the field of agricultural machinery, more particularly to towed or semi-mounted agricultural machines and especially those necessitating a larger spacing between wheels during their use than during their transport, and especially larger than the spacing authorized by the public road traffic regulations.

Description of the Related Art

In this context, the object of the invention is an agricultural machine having at least one axle device having a variable and adjustable spacing between wheels.

For a certain number of agricultural machines that are supported by the same wheels during the transport phases and the working phases, it is desirable, even necessary, to have a spacing between wheels during the working (and maneuvering) phases that is larger than that authorized during transport on roads.

Such is the case, for example, for towed swath mowers having two units, in which the spacing between wheels limits the width of the central swath. This spacing between wheels is itself limited by the permissible width during transport. The width of each wheel in turn is related to the weight of the units. Depending on the conditions (size, density, wetness, etc. of the plants to be cut), the quantity of product grouped between the wheels may be such that the swath becomes compacted, resulting in turn in uneven drying and in poorer fodder quality.

To overcome this problem, and to make the way between the working and transport phases adjustable, the Applicant has proposed for the aforesaid type of machine a foldable axle structure, such as disclosed in document EP1366650. Nevertheless, the resulting construction is complex both in its structure and in its functioning, and furthermore it is relatively bulky, especially in terms of length in transport position.

Other solutions for making the spacing between wheels of agricultural machines adjustable and using telescopic chassis or axle constructions have also been proposed, such as that of document U.S. Pat. No. 5,464,243, for example.

In these latter solutions, the sliding surfaces of the fixed part and of the movable parts have square cross sections to prevent rotation, around the sliding axis, of the movable parts relative to the chassis. And, especially when the spacing between wheels is maximal, they are subjected to large stresses, especially parallel to the forward direction, even in torsion, thus risking damaging the said telescopic structure and making it unusable in the long term, in particular depriving it of its ability for adjustment by sliding.

Thus the problem facing the present invention consists essentially of proposing, in the aforesaid context, a solution making it possible to reduce the stresses induced in the axles of telescopic type and especially those related to forces parallel to the forward direction. In fact, these stresses lead to premature wear of the sliding parts, resulting in an increase of the play and necessarily culminating in the more or less long term of dysfunctioning of the telescopic structure, especially possible jamming/blocking of the sliding parts.

BRIEF SUMMARY OF THE INVENTION

To this end, the invention has as its object a towed or semi-mounted agricultural machine having a chassis on which an axle device connecting two wheels to the said chassis is mounted, this axle device being provided with at least one movable part and one fixed part in such a way that the spacing between wheels can be modified, at least one of the wheels being integral with a movable part that is connected slidingly, along a longitudinal axis, to the fixed part, which is integral with the chassis, the machine being characterized in that the or each movable part is additionally connected mechanically to the chassis by an articulated link, on the one hand by the movable part with a first articulation and on the other hand with the chassis by a second articulation.

BRIEF DESCRIPTION OF THE SEVERAL VIEWS OF THE DRAWINGS

The invention will be better understood by virtue of the description hereinafter, which relates to preferred embodiments, provided by way of non-limitative examples and explained with reference to the attached schematic drawings, wherein.

DETAILED DESCRIPTION OF THE INVENTION

Figure 1:
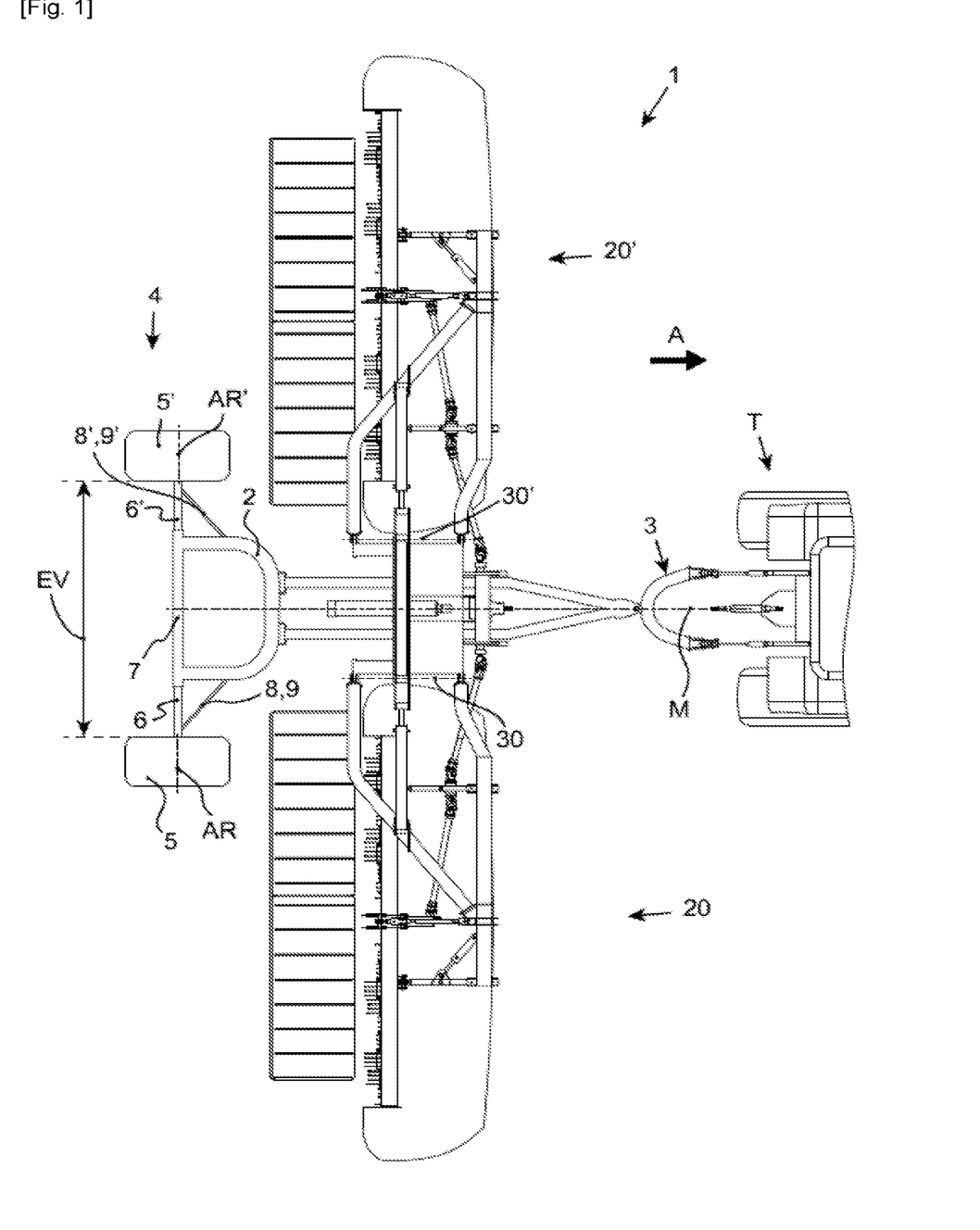
FIG. 1 is a schematic view from above of an agricultural machine (for example, of the swath mower type with two treatment units) having an adjustable axle according to one embodiment of the invention.
Figure 6:
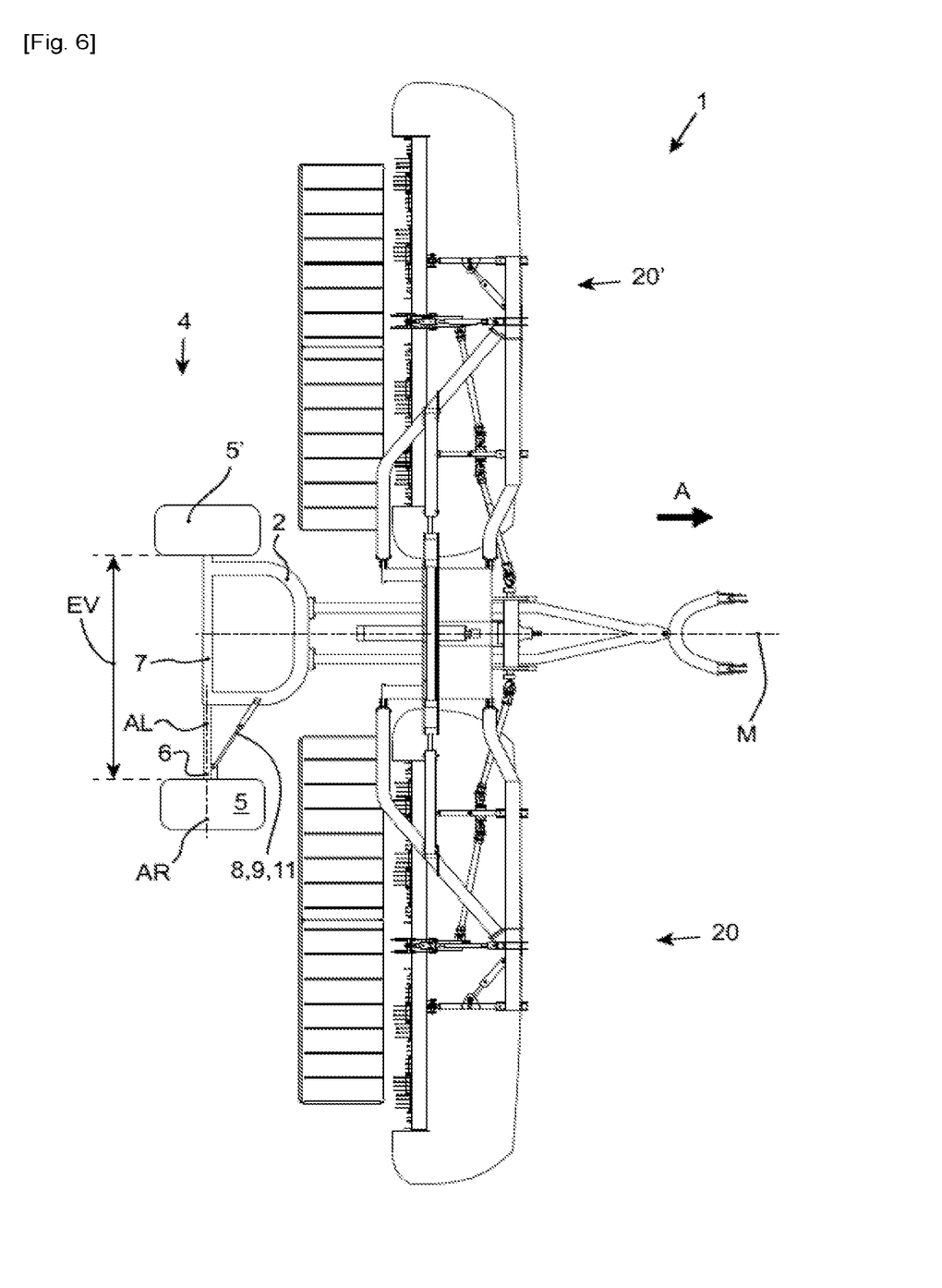
FIG. 6 is a view from above of an agricultural machine similar to that of FIG. 1, but equipped with an adjustable axle device according to another embodiment of the invention.

FIGS. 1 and 6 illustrate a towed or semi-mounted agricultural machine (1) having a chassis (2) on which an axle device (4) connecting two wheels (5, 5') to the said chassis (2) is mounted. This axle device (4) is provided with at least one movable part (6, 6') and one fixed part (7) in such a way that the spacing (EV) between the wheels (5, 5') can be modified. The axle device (4) is therefore adjustable in length, transversely and preferentially perpendicularly relative to the forward direction (A). At least one of the wheels (5, 5') is integral with the at least one movable part (6, 6'). The or each movable part (6, 6') is connected slidingly along a longitudinal axis (AL, AL') to the fixed part (7) and that fixed part (7) is integral with the chassis (2) or possibly forms an integral part thereof.

According to the invention, this machine (1) is characterized in that the or each movable part (6, 6') is additionally connected mechanically to the chassis (2) by an articulated link (8, 8'), on the one hand with the movable part (6, 6') by a first articulation (12, 12') and on the other hand with the chassis (2) by a second articulation (13, 13').

By providing one or more links (8, 8') that establish rigid connections (of length that may or may not be adjustable) between the or each movable part (6, 6') and the chassis (2), the invention makes it possible to relieve the axle device (4) of a large part of the stresses to which it is subjected during travel of the machine, especially of those parallel to the forward direction (A), and to do so regardless of the spacing (EV) between wheels (5, 5'). In particular, a reduction of the stresses in the movable (6, 6') and fixed (7) part(s) is achieved, especially during acceleration/deceleration of the machine (1) or when the said machine is traveling over rough ground (S). Effectively, the link (8, 8') supports at least part of the longitudinal forces in the forward direction (A), advantageously making it possible to reduce the stresses in the movable (6, 6') and fixed (7) part(s).

Preferentially, the or each link (8, 8') directly connects the movable part (6, 6') in question to the chassis (2). In this case, it is understood by "directly" that the movable part (6, 6') is connected to the link (8, 8') independently of the fixed part (7) and without passing through it.

As represented in FIGS. 1 and 6, the machine (1) is designed to be towed by a tractor (T) in the forward direction (A). For this purpose, it is connected to the tractor (T) by a hitching device (3), preferentially situated at the front of the machine (1). In the embodiments represented in FIGS. 1 and 6, two treatment units (20, 20') are also mounted on the chassis (2). These latter are articulated with the chassis (2) in the region of pivot connections permitting folding or raising of the said units (20, 20') around corresponding folding axes (30, 30'). The chassis (2) and respectively the machine (1) is traversed by a median plane (M) parallel to the forward direction (A) and perpendicular to the planes of the views of FIGS. 1 and 6. The second treatment unit (20') is situated on the other side of the chassis (2) and respectively of the median plane (M) relative to the first unit (20). The second treatment unit (20') is substantially identical to the first treatment unit (20). It is mounted on the chassis (2) in a manner symmetric to the first treatment unit (20) relative to the median plane (M). The chassis (2) and respectively its longitudinal dimension extends preferentially parallel to the forward direction (A).

In the preferred embodiment, the axle device (4) is provided with a fixed part (7) and two movable parts (6, 6'). Each wheel (5, 5') is integral with a respective movable part (6, 6'). Each movable part (6, 6') is connected slidingly along a respective longitudinal axis (AL, AL') to the fixed part (7), which is integral with the chassis (2). The axle device (4) is adjustable in length by sliding of the or of each movable part (6, 6') along the corresponding longitudinal axis (AL, AL') relative to the fixed part (7). Each movable part (6, 6') is connected to the chassis (2) by a respective link (8, 8'). Each link (8, 8') is articulated on the one hand with the respective movable part (6, 6') by a first articulation (12, 12'). Each link (8, 8') is articulated on the other hand with the chassis (2) by a second articulation (13, 13'). The or each movable part (6, 6') is thus connected mechanically to the chassis (2) by a respective link (8, 8'), in a manner independent of the fixed part (7). Such a construction makes it possible to obtain a machine (1) that is symmetric relative to a median plane (M).

Thus the axle device (4) is adjustable in length and the wheels (5, 5') are able to present a variable spacing (EV) between them and therefore to occupy at least one extended configuration and at least one retracted or close configuration. In the extended configuration (see FIGS. 1 and 3), the spacing (EV) between wheels (5, 5') is larger than in retracted configuration (see FIGS. 2 and 5). Adjusting the axle device (4) in length is equivalent to adjusting the spacing (EV) between wheels (5, 5').

Figure 4:
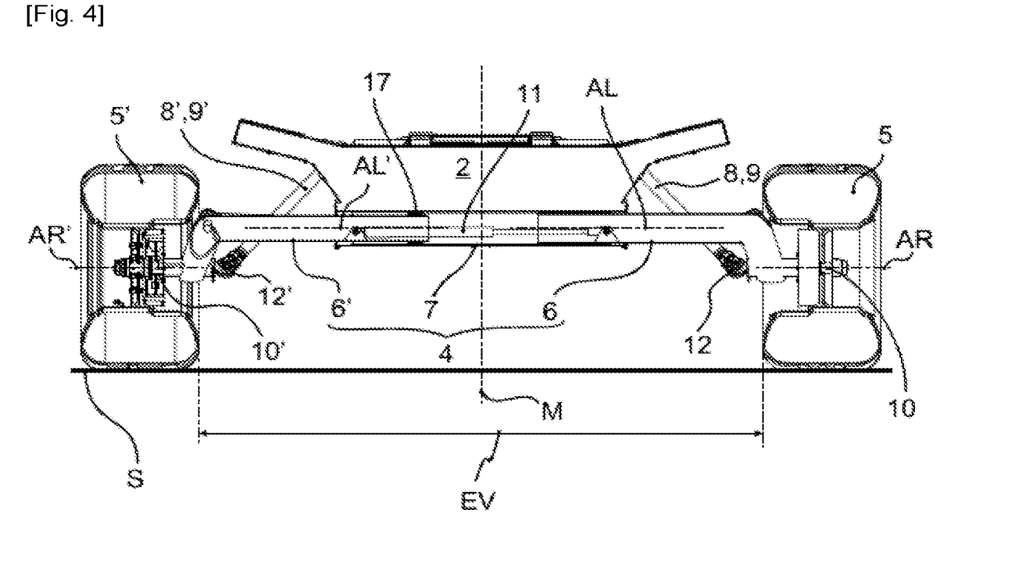
FIG. 4 is a view in elevation and in section along a vertical plane comprising the longitudinal axes of the movable parts of a rolling assembly of an agricultural machine according to FIG. 1, integrating an alternative embodiment of the axle device, wherein the wheels are in extended configuration as in FIG. 3.

It is evident from FIG. 4 that each wheel (5, 5') is integral with the respective movable part (6, 6') by way of a hub (10, 10'). The hub (10, 10') is mounted pivotably relative to the chassis (2) along a respective axis of rotation (AR, AR'). Consequently, each wheel (5, 5') is pivotable relative to the chassis (2) along the corresponding axis of rotation (AR, AR') (it turns in rotation around that axis during travel of the machine).

Figure 2:
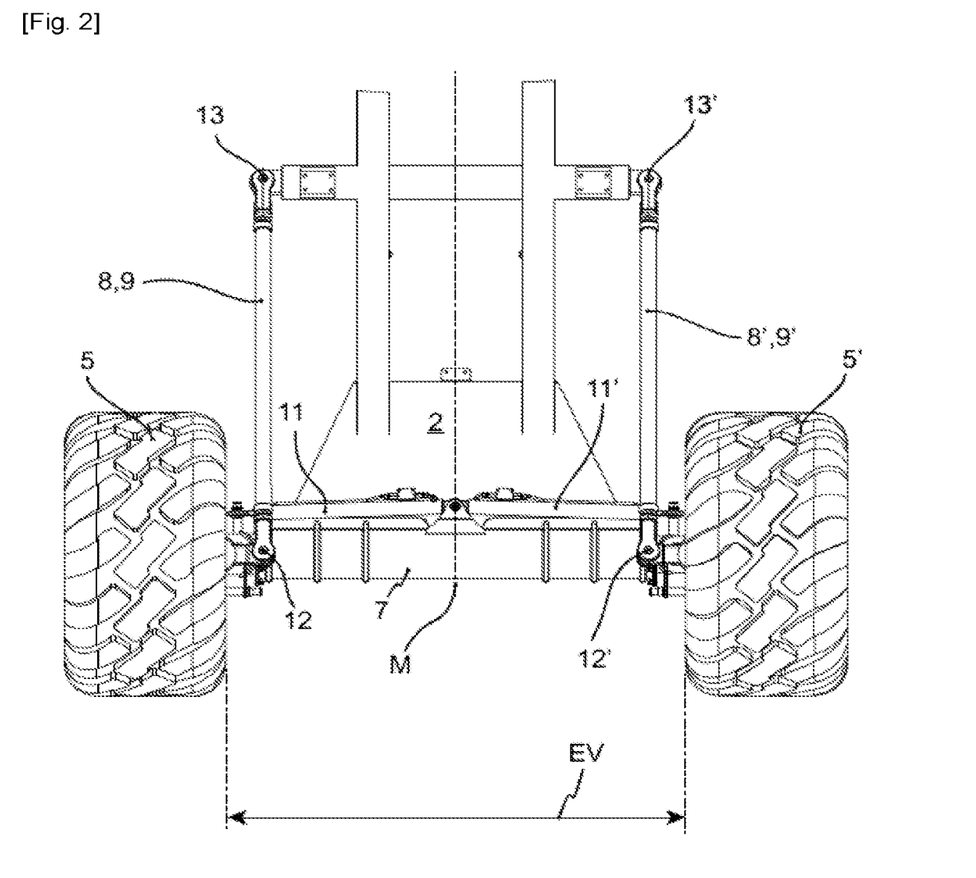
FIG. 2 is a partial view from underneath of the rolling assembly that is part of the agricultural machine of FIG. 1, wherein the wheels are in a retracted configuration.
Figure 3A:
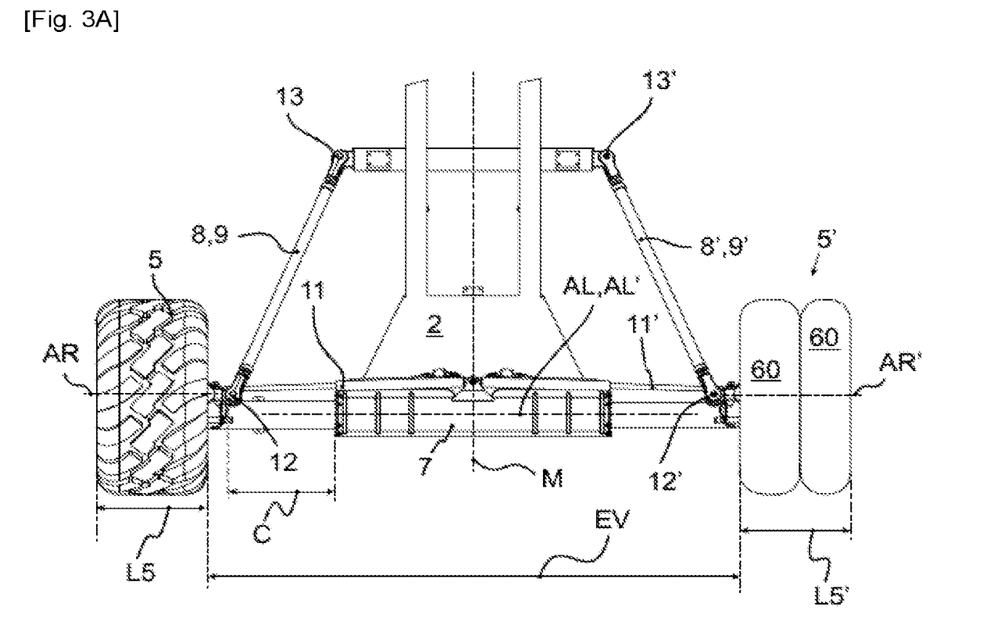
FIG. 3A is a view similar to that of FIG. 2, but with the wheels in an extended configuration (and on a different scale)
Figure 3B:
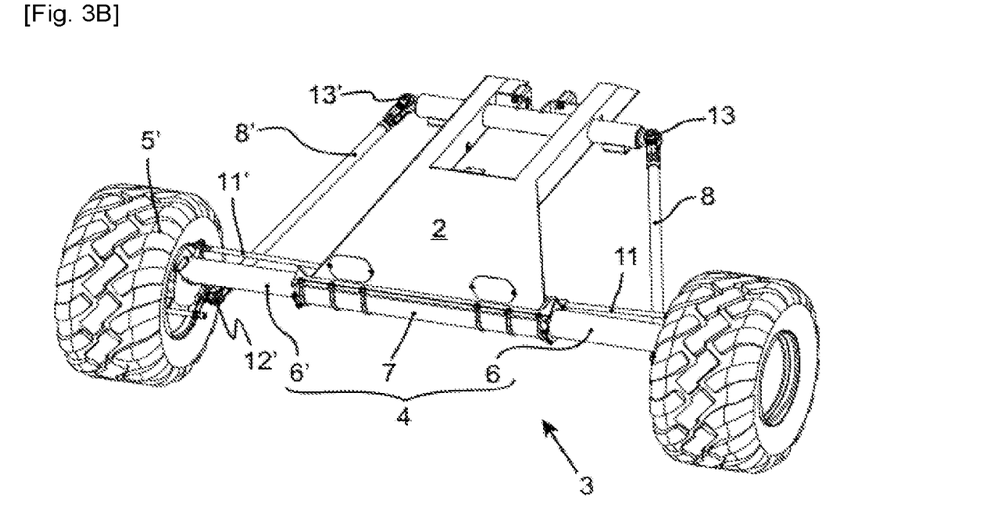
FIG. 3B is a perspective view from above of the object represented in FIG. 3A.

As is evident from FIGS. 2 and 3, the spacing (EV) between wheels (5, 5') is the distance separating the first wheel (5) (right) from the second wheel (5') (left). Logically, this spacing (EV) is measured parallel to one of the axes of rotation (AR, AR') and preferentially to both. The spacing (EV) is minimal when the wheels (5, 5') are in retracted configuration (FIG. 2). The spacing (EV) is maximal when the wheels (5, 5') are in extended configuration (FIG. 3).

Several solutions can be envisioned for achieving adjustment of the spacing (EV): manual or motorized actuation; by manual, semi-automatic or automatic (in case of motorization) command, with local or delocalized pilot control. Thus the machine (1) may comprise at least one spacing actuator (11, 11') configured to make the or each movable part (6, 6') slide relative to the fixed part (7) along a corresponding longitudinal axis (AL, AL'). The or each spacing actuator (11, 11') is advantageously realized by a transfer jack.

In the preferred embodiment represented in FIG. 2, the machine (1) comprises two spacing actuators (11, 11'). The or each spacing actuator (11, 11') is associated with a respective wheel (5, 5'). The or each spacing actuator (11, 11') is made integral with the movable part (6, 6') on the one hand and with the fixed part (7) on the other hand. The or each spacing actuator (11, 11') could also be made integral with the corresponding movable part (6, 6') and with the chassis (2).

According to the alternative embodiment represented in FIG. 4, a single actuator (11) may be provided and configured to make the movable part(s) (6, 6') slide relative to the fixed part (7) along the or each longitudinal axis (AL, AL'). In this case the actuator (11) is fixed on the one hand to a movable part (6) and on the other hand to the other movable part (6'). The actuator (11) may also be realized by a double-rod jack, the cylinder of which is made integral with the fixed part (7) and each of the rods is fixed to a respective movable part (6, 6'). In order to save space, the actuator(s) (11, 11') may be mounted inside the fixed part (7), as illustrated by way of example in FIG. 4, and/or with the interior of one or both of the movable parts (6, 6').

By virtue of the at least one spacing actuator (11, 11') of hydraulic jack type, the spacing (EV) between wheels (5, 5') can be adjusted stepwise or continuously. The spacing actuator(s) (11, 11') thus makes or make it possible to adjust the spacing (EV) between wheels (5, 5'). The or each actuator (11, 11') extends at least substantially parallel to the longitudinal axis (AL, AL') of the movable part (6, 6') in question. The or each longitudinal axis (AL, AL') is transversal and preferably orthogonal to the forward direction (A). In addition, the or each longitudinal axis (AL, AL') is horizontal and/or substantially parallel to the axis of rotation of the rear wheels of the tractor (T).

The control of the spacing actuator(s) may take place in the machine (1) but preferably takes place from the tractor (T) to which it is hitched, in such a way that the or each spacing actuator (11, 11') can be actuated during forward motion of the machine (1) to avoid damaging the plant cover.

In order to be able to follow the variations of spacing (EV) between wheels (5, 5') in particular, it is advantageously provided that the or each first articulation (12, 12') and the or each second articulation (13, 13') is of pivot or ball-joint type. In the preferred embodiment, the first (12, 12') and second (13, 13') articulations are of ball-joint type, in order to be adapted not only to the displacement of the wheels (5, 5') along the corresponding longitudinal axis but also to their displacement in the forward direction (A).

Preferentially, the fixed part (7) constitutes the female part of the axle device (4). The two movable parts (6, 6') slide in the fixed part (7). The tubular constructions of the fixed (7) and movable (6, 6') parts may have different shapes.

Thus polygonal (square, rectangular, etc.) or elliptical cross sections may be envisioned if no freedom of rotation between the fixed part (7) and the movable parts (6, 6') is sought. However, an elliptical cross section permits better distribution of the forces and stresses between fixed part (7) and movable parts (6, 6').

On the other hand, at least limited pivoting between fixed part (7) and movable part (6, 6') may be sought. In this case, it is provided that the sliding surfaces of the fixed part (7) and of the movable part(s) (6, 6') are cylindrical surfaces of circular cross section. These cylindrical surfaces may be circular continuously over their entire circumference in cross section, or only for discrete angular segments distributed over their circumference. The or each movable part (6, 6') may therefore pivot relative to the fixed part (7) around the respective longitudinal axis (AL, AL'), at least within the limit permitted by the corresponding link (8, 8'), especially during modification of the spacing (EV).

Figure 5:
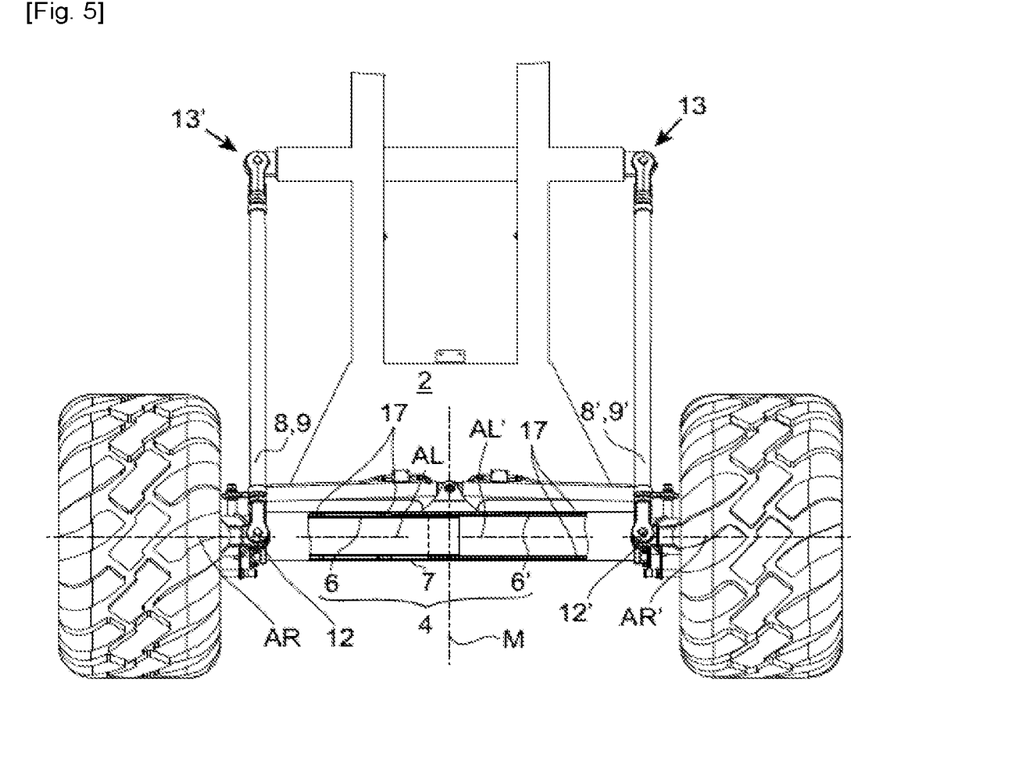
FIG. 5 is a view from underneath similar to FIG. 2 but with a partial section of the axle device along a horizontal plane comprising the longitudinal axes of the movable parts.

As represented in FIGS. 4 and 5, the contact between the sliding surfaces respectively of the fixed part (7) and of the movable parts (6, 6') may be continuous (distributed) or discontinuous (local). Thus, at least one skid (17)—for example in the form of a collar—situated between at least one movable part (6, 6') and the fixed part (7) may be provided, thus permitting linear guiding of the sliding action (see FIG. 4). Thus, as represented in FIG. 5, at least two skids (17) are mounted between each movable part (6, 6') and the fixed part (17), thus making it possible to guide the sliding action with more precision.

In a preferred embodiment, the or each skid (17) is a circular collar making it possible to guide not only the sliding action but also the pivoting along the corresponding longitudinal axis (AL, AL') of the or each movable part (6, 6') relative to the fixed part (7). In order to guide the or each movable part (6, 6') in extended configuration also, each inner skid (17) is mounted close to the inner end of the said movable part (6, 6') in extended configuration.

According to another constructive variant, it is likewise possible to provide a fixed part (7) with a square outer cross section and with a circular inner cross section, in which the or each movable part (6, 6') having circular outer cross section slides (with linear guidance) and pivots.

In order to be able to achieve a sufficient adjustment capability to meet practical needs, the shifting distance (C) of the or each wheel (5, 5') is advantageously at least equal to the width (L5, L5') of the respective wheel (5, 5'). The shifting distance (C) of each wheel (5, 5') corresponds to the sliding range of the associated movable part (6, 6'). This shifting distance (C) of a wheel (5, 5') is therefore measured along the corresponding longitudinal axis (AL, AL').

Of course, each wheel (5, 5') may be made in one piece or may be constituted by the association of several rollers or disks (60, 60) having equal diameters and being assembled together. In this case, it is considered that the width (L5, L5') of a wheel (5, 5') is the sum of the widths of the different rollers or disks (60) constituting it (see FIG. 3A). The width (L5, L5') of each wheel is related to the weight of the treatment units (20, 20'). A minimum width (L5, L5') is often necessary in order not to exert too much pressure on the ground (S), thus avoiding compacting the ground (S) and/or damaging the plant cover. Each wheel (5, 5') is guided in rotation by way of the associated hub (10, 10').

According to an important characteristic of the invention, the or each link (8, 8') comprises an element for the transmission of stresses between its first and second articulations.

According to a first simple embodiment, the or each link (8, 8') comprises a rigid connecting rod (9, 9'). Preferably, and as represented in FIG. 2, each link (8, 8') is a rigid connecting rod (9, 9'). By this it is understood that each link (8, 8') is able to transmit forces of tension and compression between the chassis (2) and the or each movable part (6, 6'). The or each connecting rod may if necessary be adjustable in length (for example, telescopic connecting rod), especially in increments, while presenting a rigid structure once the desired wheel spacing has been attained. It is evident from the foregoing that the link (8, 8') is capable of acting as a rigid connecting rod, at least during adjustment of the spacing (EV) between wheels (5, 5').

According to a second embodiment (see FIG. 6), the or each link (8, 8') may comprise a jack 11, especially of hydraulic or electric type, making it possible as the case may be to raise/lower the chassis (2) of the machine and/or its implements, for example the treatment units (20, 20') of a machine (1) of swath mover type (see FIG. 1). By virtue of the or each link (8, 8') comprising a jack or consisting of a jack, it is effectively possible to raise/lower the chassis (2) by making the or each movable part (6, 6') pivot around the corresponding longitudinal axis (AL, AL'). However, this makes the machine (1) complex, and synchronization of the jacks of the links (8, 8') and of the actuators (11, 11') is necessary. It is likewise possible that the jacks forming the links (8, 8') or making up part thereof fulfill the functions of actuators for adjustment of the spacing of the wheels (5, 5'), by commanding displacement of the movable parts (6, 6').

The arrangement and the configuration of the articulations (12, 12') of the hubs (10, 10') and of the movable parts (6, 6') may be subdivided into several alternative embodiments, resulting in different constructions but all constituting part of the invention.

Advantageously, each of the first articulations (12, 12') is situated radially relative to the wheel (5, 5') under consideration, at a distance from the corresponding longitudinal axis (AL, AL'). In addition, each of the said first articulations (12, 12') is situated at the height of the free end of the corresponding movable part (6, 6'). Thus blocking of the pivoting of the movable part(s) (6, 6') around the respective longitudinal axis (AL, AL') is achieved outside the adjustment phases. Preferably, the or each movable part (6, 6') is blocked in pivoting around the longitudinal axis (AL, AL') in all positions of the movable part (6, 6') longitudinally relative to the corresponding longitudinal axis (AL, AL'). In the case that the link (8, 8') would have the form of a cable or chain, for example, a movable part (6, 6') would actually be blocked in pivoting around the corresponding longitudinal axis (AL, AL') only in one direction of rotation, in other words only in the configuration of maximum extension of the corresponding link (8, 8').

With a view to simplification of the machine (1), the axes of rotation (AR, AR') of the wheels (5, 5') of a given axle device (4) are aligned. It is in fact evident from the figures that the first axis of rotation (AR) of the first wheel (5) is aligned with the second axis of rotation (AR') of the second wheel (5'). In simple manner, and so as not to unbalance the machine (1), the axes of rotation (AR, AR') are coincident. The or each axis of rotation (AR, AR') is obviously horizontal. As is evident in simple manner from FIG. 4, each axis of rotation (AR, AR') is parallel to the corresponding longitudinal axis (AL, AL'). Preferentially, the or each axis of rotation (AR, AR') is parallel to the longitudinal axes (AL, AL') regardless of the spacing (EV). It will be noted that the axle device (4) could be directive, and therefore that the or each axis of rotation (AR, AR') would be able not to be constantly orthogonal to the forward direction (A). Preferentially, the axle device (4) is not directive. Preferentially, the or each axis of rotation (AR, AR') is orthogonal to the forward direction (A) and to the median plane (M).

Preferentially, the or each axis of rotation (AR, AR') is offset radially relative to the longitudinal axis (AL, AL') of the movable part (6, 6') associated with the corresponding wheel (5, 5'). In addition, the or each first articulation (12, 12') is preferably also offset radially relative to the corresponding longitudinal axis (AL, AL'). As is evident from FIGS. 2 and 3, during sliding of the or each movable part (6, 6) along the corresponding longitudinal axis (AL, AL'), the link (8, 8') or respectively the connecting rod (9, 9') pivots around the corresponding second articulation (13, 13'). By virtue of the radial distance between the or each axis of rotation (AR, AR') and the longitudinal axis (AL, AL') on the one hand and of the radial distance between the or each first articulation (12, 12') and the longitudinal axis (AL, AL') on the other hand, the pivoting of the or of each link (8, 8') around the second articulation (13, 13') imposes pivoting of the or each movable part (6, 6') respectively of the or each axis of rotation (AR, AR') around the associated longitudinal axis (AL, AL'). Consequently, this pivoting of the link (8, 8') around the corresponding second articulation (13, 13') implies a displacement of the associated wheel (5, 5') along the forward direction (A), thus advantageously making it possible to act on the maneuverability of the machine (1) on the one hand and to improve its stability on the other hand. The radial distance between the or each axis of rotation (AR, AR') and the corresponding longitudinal axis (AL, AL') and the radial distance between the or each first articulation (12, 12') and the corresponding longitudinal axis thus permit adjustment of the spacing (EV) between wheels (5, 5').

By virtue of the link(s) (8, 8'), the sliding of the movable part(s) (6, 6') along the corresponding longitudinal axis (AL, AL') likewise imposes a vertical displacement of the respective longitudinal axis (AL, AL') or respectively of the chassis (2). Preferably, the or each second articulation (13, 13') is offset in height relative to the associated first articulation (12, 12') at least in one of the extended or retracted configurations, thus making it possible to compensate for the vertical displacement associated with the sliding of the movable part(s) (6, 6') along the corresponding longitudinal axis (AL, AL').

In simple manner, the radial distance between the or each axis of rotation (AR, AR') and the corresponding longitudinal axis (AL, AL') is equal to the radial distance between the or each first articulation (12, 12') and the corresponding longitudinal axis.

As is evident from FIGS. 3A and 5, the or each second articulation (13, 13') is offset along the forward direction (A) relative to the respective first articulation (12, 12') regardless of the spacing (EV) between wheels (5, 5'). Such an embodiment makes it possible to be certain that the or each link (8, 8') supports at least part of the longitudinal forces in the forward direction (A), thus reducing the stresses in the or each movable part (6, 6') and the fixed (7) part regardless of the spacing (EV) between wheels (5, 5'). In order to reduce the bulkiness of the agricultural machine (1) along the forward direction (A), the second articulations (13, 13') are situated in front of the first articulations (12, 12') regardless of the spacing (EV) between wheels (5, 5').

It is likewise evident from FIGS. 3A and 5 that the angle formed by the or each link (8, 8') and the forward direction (A) is preferably smaller than 60°, preferentially smaller than 45°, and more preferentially smaller than 35° in extended configuration. In fact, the more this angle is acute, the larger the part of the longitudinal forces in the forward direction (A) supported by the link(s) (8, 8') will be, and the more the stresses in the or each movable part (6, 6') will be reduced.

The axle device (4) therefore has the general shape of a crankshaft. The fixed part (7) would form the eccentric crank, and each axis of rotation (AR, AR') would form the central axis of the crankshaft.

Preferably, the or each axis of rotation (AR, AR') is situated below the corresponding longitudinal axis (AL, AL'), at least when the spacing (EV) between wheels is (5, 5') is maximum. Such a characteristic makes it possible to space the fixed part (7) and/or the chassis (2) from the ground (S) while preserving a standard outside diameter of the wheels (5, 5') adapted to the use of the machine (1). A standard diameter of wheel (5, 5') adapted for the use of an agricultural machine (1) such as described in this document ranges between 1.2 and 1.3 meters, preferably between 1.1 and 1.4 meters and more preferentially yet between 0.9 m and 1.5 m. Thus the distance between the ground (S) and the fixed part (7) is larger than that between the ground (S) and each movable part (6, 6'), thus advantageously making it possible to pass over a higher obstacle between the wheels (5, 5'). Preferably, the longitudinal axis (AL) is situated above the axes of rotation (AR, AR') of hubs (10, 10') regardless of the spacing (EV), so that a large ground clearance is always obtained at the center of the machine (1).

According to another possible constructive characteristic, the longitudinal axes (AL AL') of the movable parts (6, 6') are parallel. Preferably, the longitudinal axes (AL, AL') of the movable parts (6, 6') are mutually aligned, making it possible to simplify the machine (1). In particular, manufacture of the fixed part (7) is simpler. This is preferentially achieved by a metal tube.

The movable parts (6, 6') are preferentially dimensioned in such a way that one is able to slide in the other. As represented in FIG. 5, the left movable part (6') is able to slide in the right movable part (6). Thus the shifting distances (C) of the movable parts (6, 6') overlap with one another when the spacing (EV) is minimum, in such a way that the wheels (5, 5') are able to be closer to one another at minimum spacing (EV).

According to a possible additional characteristic, the or each first articulation (12, 12) is situated at a larger distance from the respective longitudinal axis (AL, AL') than from the respective axis of rotation (AR, AR'). Preferably, each of the first articulations (12, 12') is situated on the respective axis of rotation (AR, AR'). In this way, by virtue of a larger lever arm, the stresses in the movable (6, 6') and fixed (7) part(s) are reduced even more during acceleration/deceleration of the machine (1) or when the said machine is traveling over rough ground (S). The machine (1) could also comprise several axle devices according to the invention.

FIG. 6 illustrates another embodiment of the invention in which the axle device (4) is provided with only one movable part (6) associated with one (5) of the wheels, the other wheel being mounted on the fixed part (7). The single link (8) may comprise, as actuator for adjustment of the spacing (EV), a connecting rod (9) that is adjustable in length or a jack (11), and that as the case may be connects the fixed (7) and movable (6) parts. The other arrangements described above in relation with the link (8), the movable part (6), the articulations (12 and 13) and the axis of rotation (AR) may also be applied in this other embodiment.

Of course, the invention is not limited to the embodiments described and represented in the attached drawings. Modifications are still possible especially from the viewpoint of the constitution of the various elements or by substitution of equivalent techniques, without departing from the scope of protection of the invention.

The invention claimed is:

1. A towed or semi-mounted agricultural machine comprising:
a chassis on which an axle device connecting two wheels to said chassis is mounted, said axle device being provided with a movable part and one fixed part in such a way that a spacing between the wheels can be modified, at least one of the wheels being integral with the movable part that is connected slidingly along a longitudinal axis to the fixed part, which is integral with the chassis,
wherein the movable part is additionally connected mechanically to the chassis by a link, which is articulated with the movable part by a first articulation and articulated with the chassis by a second articulation,
wherein the link is a rigid connecting rod,
wherein the link is able to transmit forces of tension and compression between the chassis and the movable part, and
wherein an axis of rotation of each wheel is offset radially relative to the longitudinal axis of the movable part associated with that wheel, the first articulation also being offset radially relative to the longitudinal axis of the movable part.

2. The agricultural machine according to claim 1, further comprising a spacing actuator configured to make the movable part slide relative to the fixed part along the longitudinal axis.

3. The agricultural machine according to claim 2, wherein the spacing actuator is made integral with the movable part and with the fixed part.

4. The agricultural machine according to claim 1, wherein the first articulation and the second articulation are a pivot or a ball-joint.

5. The agricultural machine according to claim 1, wherein surfaces for slidingly guiding the fixed part and the movable part are cylindrical surfaces of circular cross section.

6. The agricultural machine according to claim 1, wherein the movable part includes two movable parts, and longitudinal axes of the two movable parts are mutually aligned.

7. The agricultural machine according to claim 1, wherein the first articulation is offset radially relative to the longitudinal axis of the movable part and relative to an axis of rotation of the wheel associated with the movable part, the first articulation being situated at a larger distance from the longitudinal axis than from the axis of rotation of the wheel.

8. The agricultural machine according to claim 1, wherein a shifting distance for sliding of the movable part is at least equal to a width of the wheel associated with the movable part.

9. The agricultural machine according to claim 1, wherein the second articulation is offset in height relative to the first articulation, at least in one of extended or retracted configurations.

10. The agricultural machine according to claim 1, wherein the second articulation is offset along a forward direction relative to the first articulation regardless of the spacing between wheels.

11. The agricultural machine according to claim 1, wherein the link is configured and arranged in such a way that the sliding of the movable part along the longitudinal axis imposes a vertical displacement of the longitudinal axis or of the chassis.

12. The agricultural machine according to claim 1, wherein a radial distance between an axis of rotation of each wheel and the longitudinal axis is equal to a radial distance between the first articulation and the longitudinal axis.

13. The agricultural machine according to claim 1, wherein an angle formed by the link and a forward direction is smaller than 60° in an extended configuration.

14. The agricultural machine according to claim 1, wherein the connecting rod is a telescopic connecting rod.

* * * * *